United States Patent
Liu et al.

(10) Patent No.: US 10,356,834 B2
(45) Date of Patent: Jul. 16, 2019

(54) METHOD AND USER EQUIPMENT FOR REESTABLISHING RRC CONNECTION

(71) Applicant: China Academy of Telecommunications Technology, Beijing (CN)

(72) Inventors: Aijuan Liu, Beijing (CN); Yumin Wu, Beijing (CN)

(73) Assignee: CHINA ACADEMY OF TECHNOLOMMUNICATIONS TECHNOLOGY, Beijing (CN)

( * ) Notice: Subject to any disclaimer, the term of this patent is extended or adjusted under 35 U.S.C. 154(b) by 77 days.

(21) Appl. No.: 14/772,075

(22) PCT Filed: Mar. 4, 2014

(86) PCT No.: PCT/CN2014/072845
§ 371 (c)(1),
(2) Date: Sep. 2, 2015

(87) PCT Pub. No.: WO2014/135061
PCT Pub. Date: Sep. 12, 2014

(65) Prior Publication Data
US 2016/0014839 A1  Jan. 14, 2016

(30) Foreign Application Priority Data

Mar. 5, 2013  (CN) .......................... 2013 1 0069100

(51) Int. Cl.
*H04W 76/19*  (2018.01)
*H04W 76/18*  (2018.01)
(Continued)

(52) U.S. Cl.
CPC ............ *H04W 76/19* (2018.02); *H04W 76/11* (2018.02); *H04W 76/18* (2018.02); *H04W 76/27* (2018.02)

(58) Field of Classification Search
None
See application file for complete search history.

(56) References Cited

U.S. PATENT DOCUMENTS

2005/0172024 A1*  8/2005  Cheifot ............. H04L 29/12009
                                                709/225
2009/0313580 A1* 12/2009  Nakata .................... A63F 13/00
                                                715/810
(Continued)

FOREIGN PATENT DOCUMENTS

CN     102860078 A     1/2013
CN     102932821 A     1/2013
(Continued)

OTHER PUBLICATIONS

3GPP Release 8. 3GPP TS 36.331 V8.8.0 (Dec. 2009). 3rd Generation Partnership Project; Technical Specification Group Radio Access Network; Evolved Universal Terrestrial Radio Access (E-UTRA) Radio Resource Control (RRC) Protocol specification (Release 8).*
(Continued)

*Primary Examiner* — Jeffrey M Rutkowski
*Assistant Examiner* — Andre Tacdiran
(74) *Attorney, Agent, or Firm* — Kilpatrick Townsend & Stockton LLP (57) ABSTRACT

Provided in an embodiment of the present invention are a method and user equipment (UE) for reestablishing an RRC connection. The method of the embodiment of the present invention includes a UE having experienced a connection failure initiates a request for reestablishing an RRC connection in a selected reestablishment cell, and when determining that the reestablishment cell does not meet a preset cell selection criterion or the UE did not receive an RRC connection reestablishment command transmitted by the network side device that the reestablishment cell belongs to, the UE determines not to carry, in the information related to
(Continued)

---

11

A UE subjected to a connection failure initiates an RRC connection reestablishment request on a selected reestablishment cell

↓ 12

The UE determines to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell the connection failure and stored by the UE, the identifier information of the reestablishment cell, or not to store any information related to the connection failure.

4 Claims, 8 Drawing Sheets

(51) Int. Cl.
*H04W 76/27* (2018.01)
*H04W 76/11* (2018.01)

(56) References Cited

U.S. PATENT DOCUMENTS

| | | | | |
|---|---|---|---|---|
| 2011/0317552 | A1* | 12/2011 | Lee | H04L 5/001 370/228 |
| 2012/0196603 | A1* | 8/2012 | Mochizuki | H04W 48/02 455/436 |
| 2012/0322449 | A1* | 12/2012 | Shimizu | H04W 36/24 455/436 |
| 2013/0137429 | A1* | 5/2013 | Zhang | H04W 36/0061 455/434 |
| 2013/0260766 | A1* | 10/2013 | Lee | H04W 76/068 455/436 |
| 2014/0023032 | A1* | 1/2014 | Kim | H04W 74/0833 370/329 |
| 2014/0050102 | A1* | 2/2014 | Lee | H04W 24/10 370/242 |
| 2014/0126545 | A1* | 5/2014 | Tamura | H04W 36/30 370/332 |
| 2014/0146759 | A1* | 5/2014 | Cho | H04W 76/046 370/329 |
| 2014/0335855 | A1* | 11/2014 | Lee | H04W 24/10 455/426.1 |
| 2015/0055448 | A1* | 2/2015 | Lee | H04B 7/26 370/216 |
| 2015/0131454 | A1* | 5/2015 | Wegmann | H04L 41/069 370/242 |
| 2015/0208303 | A1* | 7/2015 | Jung | H04W 8/08 455/436 |
| 2015/0271868 | A1* | 9/2015 | Rune | H04W 4/005 370/311 |
| 2016/0330785 | A1* | 11/2016 | Chang | H04W 24/04 |

FOREIGN PATENT DOCUMENTS

| | | |
|---|---|---|
| WO | 2012019339 A1 | 2/2012 |
| WO | 2012023336 A1 | 2/2012 |
| WO | 2012138079 A2 | 10/2012 |
| WO | 2013020599 A1 | 2/2013 |

OTHER PUBLICATIONS

LTE. TS 136 331 V10.1.0. Evolved Universal Terrestrial Radio Access (E-UTRA); Radio Resource Control (RRC); Protocol specification (3GPP TS 36.331 version 10.1.0 Release 10) (Apr. 2011).*
3GPP TS 36.331 V10.5.0. 3rd Generation Partnership Project; Technical Specification Group Radio Access Network; Evolved Universal Terrestrial Radio Access (E-UTRA); Radio Resource Control (RRC); (Mar. 2012) (Year: 2012).*
Fujitsu, "Discussion on causes of failed RRC re-establishment for MRO," 3GPP Draft; R3-130055, $3^{rd}$ Generation Partnership Project (3GPP), Mobile Competence Centre; 650, Route des Lucioles; F-06921 Sophia-Antipolis Cedex; France, vol. RAN WG3, no. Malta; Feb. 1, 2013, Jan. 18, 2013, XP050670878, 4 pages. Retrieved from the Internet: URL:http://www.3gpp.org/ftp/tsg_ran/WG3_lu/TSGR3 79/Docs/ [retrieved on Jan. 18, 2013] *paragraph [0002]—paragraph [02.1]* *paragraph [0003]*.
Huawei et al., "Impact on MRO from RRC re-establishment," 3GPP Draft; R3-131285 RRCREESTOUTCOME, $3^{rd}$ Generation Partnership Project (3GPP), Mobile Competence Centre; 650, Route des Lucioles; F-06921 Sophia-Antipolis Cedex; France, vol. RAN WG3, no. Barcelona, Spain; Aug. 19, 2013-Aug. 23, 2013 Aug. 9, 2013, XP050719447, 8 pages. Retrieved from the Internet: URL: http://www.3gpp.org/ftp/tsg_ran/WG3_lu/TSGR3_81/Docs/ [retrieved on Aug. 9, 2013] *paragraph [04.1].
European Search Report for EP14760904 dated May 12, 2016, 7 pages.
3GPP, "Evolved Universal Terrestrial Radio Access (E-UTRA); Radio Resource Control (RRC); Protocol specification", 3GPP TS 36, 300 V11, 4, 0, Jan. 3, 2013 (Jan. 3, 2013), section 20.2.2.12 and 22.4.2.2.
International Search Report and Written Opinion of PCT /CN2014/072845 (English and Chinese).
3GPP TS 36.331 V8.8.0 (Dec. 2009); 3rd Generational Partnership Project; Technical Specification Group Radio Access Network; Evolved Universal Terrestrial Radio Access (E-UTRA) Radio Resource Control (RRC); Protocol specification (Release 8), 211 pages.

* cited by examiner

METHOD AND USER EQUIPMENT FOR REESTABLISHING RRC CONNECTION

This application is a US National Stage of International Application No. PCT/CN2014/072845, filed on 4 Mar. 2014, designating the United States, and claiming the benefit of Chinese Patent Application No. 201310069100.5, filed with the State Intellectual Property Office of People's Republic of China on Mar. 5, 2013 and entitled "Method for reestablishing RRC connection, and user equipment", which is hereby incorporated by reference in its entirety.

FIELD

The present invention relates to the field of communications and particularly to a method for reestablishing an RRC connection, and a user equipment.

BACKGROUND

It is highly desirable for a communication operator to lower the complexity of operation and management tasks so as to lower an operation and maintenance cost. It is desirable to introduce a network self-organization mechanism to a next-generation network to thereby alleviate human participation in network planning, operation and maintenance so as to lower deployment and operation cost of the network. It is in view of this background that the characteristics of a Self-Organizing Network (SON) in the Evolved Universal Terrestrial Radio Access (E-UTRA) system have been studied as a work item in the $3^{rd}$ Generation Partnership Project (3GPP). The SON technologies relate to self-configuration, self-optimization, and self-healing, where self-optimization is one of the important characteristics.

The SON self-optimization function needs to detect some network and system performance parameters as input, e.g., a statistic of a network performance index, a failure alarm, an alert, etc. After the input data is analyzed, a decision is made by using an optimization algorithm, and an adjusting operation of a related network node is finally triggered automatically.

In a mobile network, inappropriate setting of a handover parameter may seriously affect the performance of the system, and a call of a user may be dropped in a most serious case, so one of the most important issues to be addressed by the SON in the E-UTRA system is self-optimization of the handover parameter which is able to reduce handover failure, to reduce dropped call of the user due to an inappropriate handover, and to reduce unnecessary handover, thereby avoiding these handovers from accessing system resource uselessly. It is the first step for Mobility Robustness Optimization (MRO) to determine accurately an underlying cause of the failure.

The inappropriate handover typically arises from unreasonable setting of the handover parameter in the following several scenarios:

a) The terminal fails to be handed over to a cell with a better radio signal in a timely manner, and a signal of an original serving cell is deteriorating constantly until a call of the user is dropped, which can be referred to as "handover too late", meaning that the handover should have been performed earlier but has been delayed due to inappropriate setting of the parameter;

b) The terminal is handed over from a source cell to a destination cell, but a signal of the destination cell is not stable, so that the terminal is subjected to a Radio Link Failure (RLF) shortly after the handover, and thereafter the terminal reselects a new cell to reestablish a connection, which can be referred to as "handover to wrong cell", meaning that the cell to which the connection is reestablished is an appropriate cell indeed, whereas the originally selected destination cell is not appropriate; and c) The terminal is handed over from a source cell to a destination cell, but the terminal is subjected to an RLF shortly, and thereafter the terminal selects the source cell to reestablish a connection, which can be referred to as "handover too early".

Handover too late can be determined as per the following criterion:

The User Equipment (UE) (or referred to a terminal) is subjected to an RLF before the handover is triggered, and then the UE attempts on reestablishing a connection to another cell than the source cell.

Handover too early can be determined as per the following criterion:

The UE is subjected to an RLF shortly after being handed over to the destination cell, or is subjected to a HandOver Failure (HOF) during the handover, and then the UE attempts to reestablish a connection to the source cell.

Handover to wrong cell can be determined as per the following criterion:

The UE is subjected to an RLF (either in the source cell or in the destination cell) during the handover, or an RLF occurring shortly after being handed over to the destination cell, and then the UE attempts on reestablishing a connection to a third-party cell (other than the source cell and the destination cell).

In a real network, the UE is subjected to an RLF generally due to the following two reasons: firstly the handover parameter may be set inappropriately so that the serving cell of the UE fails to be changed in a timely manner, so the quality of a signal of the serving cell may be too low to provide the service, thus resulting in an RLF; and secondly there may be a coverage hole or shadowed fading in the network, and when the UE moves to the hole or a shadowed site, a radio link condition will be deteriorated sharply, thus resulting in an RLF.

Only the first reason relates to the handover problem, whereas the second reason relates to the coverage problem and will be precluded from MRO detection. These two reasons can be determined from Reference Signal Received Power (RSRP)/Reference Signal Received Qualities (RSRQs) of the current cell and an adjacent cell measured upon the failure. If RSRP/RSRQs of both the cells measured by the UE upon the failure are poor, then it indicates a coverage hole; otherwise, it indicates a handover problem. In order to assist the network side to determine an MRO, the UE needs to report information related to the connection failure (the RLF or the HOF), including the following items:

1. If the connection failure is the RLF, then the UE reports the ID of the last serving cell of the UE; and if the connection failure is the HOF, then the UE reports the ID of the destination cell to which the UE is handed over;

2. The ID of the cell to which a Radio Resource Control (RRC) connection is reestablished;

3. The ID of the cell from which the handover is initiated;

4. A period of time from the initiation of the last handover to the occurrence of the connection failure;

5. An indicator of whether the current failure is the RLF or the HOF; and

6. Measurement information including the RSRP/RSRQ of the serving cell, and the RSRP/RSRQ of the adjacent cell when the RLF occurs.

In the 3GPP specification, the UE will record the items 1, 3, 4, 5 and 6 above when the RLF or the HOF occurs, and the item 2 above when an RRC connection reestablishment request message is sent. The UE reports the recorded information related to the connection failure to the network side after the RRC connection is reestablished successfully or the RRC connection is established successfully. The network side determines from the information related to the connection failure, reported by the UE whether handover too early/handover too late/handover to wrong cell arises from the coverage problem or inappropriate setting of the handover parameter.

At present the UE subjected to the connection failure (the RLF or the HOF) will record a certain cell as a reestablishment cell as long as the UE is ready to initiate an RRC connection reestablishment request to the cell. However such a scenario is very like to occur that the cell may not satisfy a cell selection criterion after the UE initiates the RRC connection reestablishment request, or the UE may fail to receive an RRC connection reestablishment command sent by the network side after initiating the RRC connection reestablishment request. In this scenario, the UE may still report the information related to the connection failure, carrying the ID of the reestablishment cell, to the network side, and the network side will still regard the reestablishment cell as an appropriate cell, and perform determination and optimization of the MRO, thus optimizing the handover parameter incorrectly.

In summary, in the existing specification, the UE subjected to the connection failure will record a certain cell as a reestablishment cell, and report the ID of the reestablishment cell to the network side, as long as the UE is ready to initiate an RRC connection reestablishment request to the cell, so that the network side may optimize the handover parameter incorrectly in the scenario that the cell does not satisfy the preset cell selection criterion, or that the UE fails receive an RRC connection reestablishment command sent by the network side.

SUMMARY

Embodiments of the invention provide a method for reestablishing an RRC connection, and a user equipment so as to address such a problem in the prior art that the network side may optimize a handover parameter incorrectly in the scenario that during the RRC connection reestablishment to a certain cell by a UE subjected to a connection failure, the cell does not satisfy a preset cell selection criterion, or the UE fails to receive an RRC connection reestablishment command sent by the network side.

An embodiment of the invention provides a method for reestablishing an RRC connection, the method including:

initiating, by a UE subjected to a connection failure, an RRC connection reestablishment request on a selected reestablishment cell; and determining, by the UE, to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

Preferably the UE stores an ID of the reestablishment cell into the information related to the connection failure when the RRC connection reestablishment request is initiated on the reestablishment cell; and the UE deletes the ID of the reestablishment cell stored in the information related to the connection failure upon determining that the reestablishment cell does not satisfy the preset cell selection criterion, or that the UE fails to receive a RRC connection reestablishment command sent by the network-side device controlling the reestablishment cell.

Preferably the UE stores no ID of the reestablishment cell into the information related to the connection failure when the RRC connection reestablishment request is initiated on the reestablishment cell.

Preferably the UE stores an ID of the reestablishment cell into the information related to the connection failure when the RRC connection reestablishment request is initiated on the reestablishment cell; and the UE deletes all the information related to the connection failure stored by the UE upon determining that the reestablishment cell does not satisfy the preset cell selection criterion, or that the UE fails to receive a RRC connection reestablishment command sent by the network-side device controlling the reestablishment cell.

Further to any one of the embodiments of the method, preferably determining, by the UE, that the UE fails to receive a RRC connection reestablishment command sent by the network-side device controlling the reestablishment cell includes:

starting, by the UE, a configured timer when the RRC connection reestablishment request is sent to the network-side device controlling the reestablishment cell; and determining, by the UE, that the UE fails to receive an RRC connection reestablishment command sent by the network-side device controlling the reestablishment cell, when the configured timer expires.

An embodiment of the invention provides a user equipment, where the user equipment is subjected to a connection failure, and the user equipment includes:

a first processing module configured to initiate an RRC connection reestablishment request on a selected reestablishment cell; and a second processing module configured to determine to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

Preferably the first processing module is configured to store an ID of the reestablishment cell into the information related to the connection failure when the RRC connection reestablishment request is initiated on the reestablishment cell; and the second processing module is configured to delete the ID of the reestablishment cell stored in the information related to the connection failure upon determining that the reestablishment cell does not satisfy the preset cell selection criterion, or that the UE fails to receive a RRC connection reestablishment command sent by the network-side device controlling the reestablishment cell.

Preferably the first processing module is configured to store no ID of the reestablishment cell into the information related to the connection failure when the RRC connection reestablishment request is initiated on the reestablishment cell.

Preferably the first processing module is configured to store an ID of the reestablishment cell into the information related to the connection failure when the RRC connection reestablishment request is initiated on the reestablishment cell; and the second processing module is configured to delete all the information related to the connection failure stored by the UE upon determining that the reestablishment cell does not satisfy the preset cell selection criterion, or that the UE fails to receive a RRC connection reestablishment command sent by the network-side device controlling the reestablishment cell.

Further to any one of the embodiments of the user equipment, preferably the second processing module configured to determine that the UE fails to receive a RRC connection reestablishment command sent by the network-side device controlling the reestablishment cell is configured to start a configured timer when the RRC connection reestablishment request is sent to the network-side device controlling the reestablishment cell; and to determine that the UE fails to receive an RRC connection reestablishment command sent by the network-side device controlling the reestablishment cell, when the configured timer expires.

Based upon the same inventive idea as the method, an embodiment of the invention provides another user equipment including a processor and a radio frequency unit, wherein:

the processor is configured to initiate an RRC connection reestablishment request on a selected reestablishment cell through the radio frequency unit upon determining that the UE is subjected to the connection failure; and to determine to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

In the embodiments of the invention, the UE subjected to a connection failure initiates an RRC connection reestablishment request on a selected reestablishment cell, and the UE determines to carry, in information related to the connection failure stored by the UE, no ID of the selected reestablishment cell or to store no information related to the connection failure, upon determining that the reestablishment cell does not satisfy the preset cell selection criterion, or that the UE fails to receive a RRC connection reestablishment command sent by the network-side device controlling the reestablishment cell, thus avoiding the network side from optimizing the handover parameter incorrectly.

DETAILED DESCRIPTION OF THE EMBODIMENTS

In embodiments of the invention, a UE subjected to a connection failure initiates an RRC connection reestablishment request on a reestablishment cell, and the UE determines to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell, thus avoiding the network side from optimizing a handover parameter incorrectly in the scenario above.

The embodiments of the invention will be described below in further details with reference to the drawings.

Figure 1:
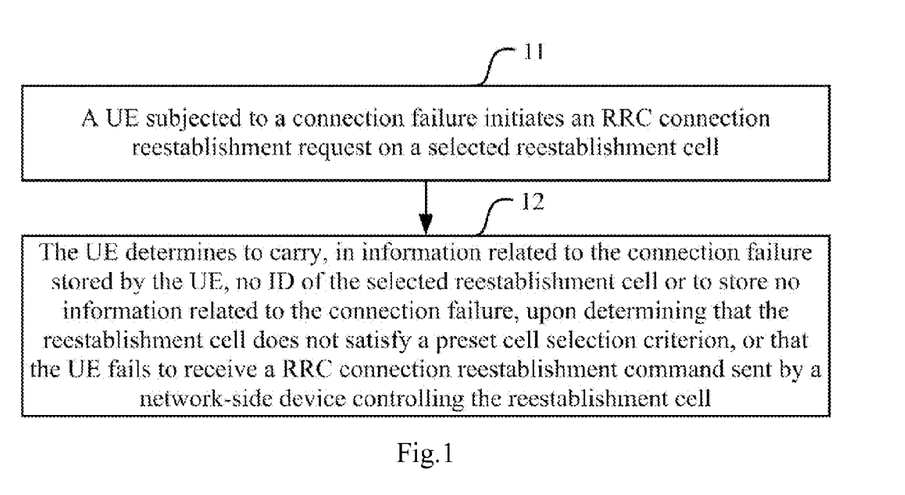
FIG. 1 illustrates a flow chart of a method for reestablishing an RRC connection according to an embodiment of the invention.

Referring to FIG. 1, a method for reestablishing an RRC connection according to an embodiment of the invention includes the following steps:

In the step 11, a UE subjected to a connection failure initiates an RRC connection reestablishment request on a selected reestablishment cell; and In the step 12, the UE determines to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

In an implementation, the connection failure indicates that the UE is disconnected from a cell accessed by the UE, e.g., an RLF, an HOF, etc.

In an implementation, the ID of the reestablishment cell can be an E-CGI (E-CGI stands for E-UTRAN Cell Global ID; E-UTRAN stands for Evolved UMTS Terrestrial Radio Access Network; UMTS stands for Universal Mobile Telecommunication System; and ID stands for Identifier), etc.

In an implementation, the UE will record one or more of the following information into the information related to the connection failure upon determining that the UE is subjected to the connection failure (i.e., the RLF or the HOF):

The ID of the cell where the connection failure occurs, where if the connection failure is the RLF, then the UE reports the ID of the last serving cell of the UE; and if the connection failure is the HOF, then the UE reports the ID of the destination cell to which the UE is handed over;

The ID of the cell from which the handover is initiated;

A period of time from the initiation of the last handover to the occurrence of the connection failure;

An indicator to indicate whether the current failure is the RLF or the HOF; and

Measurement information including the RSRP/RSRQ of the serving cell of the UE when the connection failure occurs, and the RSRP/RSRQ of an adjacent cell when the connection failure occurs.

In an implementation, the UE reselects a cell as per a preset cell selection criterion, and initiates an RRC connection reestablishment procedure, upon determining that the UE is subjected to the connection failure.

It shall be noted that reference can be made to the specification in the 3GPP 36.304 protocol for the preset cell selection criterion in the embodiment of the invention, and reference can be made to the 3GPP 36.304 protocol for the determination by the UE of whether the reestablishment cell satisfies the preset cell selection criterion.

In an implementation, the UE determines that the UE fails to receive an RRC connection reestablishment command sent by the network-side device controlling the reestablishment cell in the step 12 in the following steps:

The UE starts a configured timer (e.g., a timer T301) when the RRC connection reestablishment request is sent to the network-side device controlling the reestablishment cell; and The UE determines that the UE fails to receive an RRC connection reestablishment command sent by the network-side device controlling the reestablishment cell, when the configured timer expires.

In an implementation, if the UE stores the information related to the connection failure, then the UE determines to carry, in information related to the connection failure stored by the UE, no ID of the selected reestablishment cell in the step 12.

If the UE stores the information related to the connection failure, then furthermore the information related to the connection failure can be further stored in the following two approaches:

In an approach A1, the UE stores the ID of the reestablishment cell into the information related to the connection failure when the RRC connection reestablishment request is initiated on the reestablishment cell, and at this time the information related to the connection failure stored by the UE includes both the information recorded by the UE upon determining that the UE is subjected to the connection failure, and the ID of the reestablishment cell; and The UE deletes the ID of the reestablishment cell stored in the information related to the connection failure, upon determining that the reestablishment cell does not satisfy the preset cell selection criterion, or that the UE fails to receive an RRC connection reestablishment command sent by the network-side device controlling the reestablishment cell, and at this time the information related to the connection failure stored by the UE includes only the information recorded by the UE upon determining that the UE is subjected to the connection failure.

In this method, if the UE is subsequently connected with the network side in an RRC connection establishment procedure, and reports the information related to the connection failure stored by the UE to the network side, then the information related to the connection failure carries no ID of the reestablishment cell.

In a method A2, the UE stores no ID of the reestablishment cell into the information related to the connection failure when the RRC connection reestablishment request is initiated on the reestablishment cell, and at this time the information related to the connection failure stored by the UE includes only the information recorded by the UE upon determining that the UE is subjected to the connection failure.

In this method, if the UE is subsequently connected with the network side in an RRC connection establishment procedure, and reports the information related to the connection failure stored by the UE to the network side, then the information related to the connection failure carries no ID of the reestablishment cell.

It shall be noted that in this method, the UE stores no ID of the reestablishment cell into the information related to the connection failure when the RRC connection reestablishment request is initiated on the reestablishment cell; and in the RRC connection reestablishment procedure, if the UE determines that the RRC connection reestablishment is successful (that is, the UE receives an RRC connection reestablishment command sent by the network-side device controlling the reestablishment cell) or the RRC connection reestablishment is rejected (that is, the UE receives an RRC Connection Reestablish Reject message sent by the network-side device controlling the reestablishment cell), then the UE stores the ID of the reestablishment cell into the information related to the connection failure, and in this scenario, the information related to the connection failure stored by the UE includes both the information recorded by the UE upon determining that the UE is subjected to the connection failure, and the ID of the reestablishment cell.

In an implementation, if the UE determines in the step 12 to store no information related to the connection failure, then preferably the information related to the connection failure can be stored as follows:

The UE stores the ID of the reestablishment cell into the information related to the connection failure when the RRC connection reestablishment request is initiated on the reestablishment cell, and at this time the information related to the connection failure stored by the UE includes both the information recorded by the UE upon determining that the UE is subjected to the connection failure, and the ID of the reestablishment cell; and The UE deletes all the information related to the connection failure stored by the UE, that is, the UE does not store any information related to the connection failure, upon determining that the reestablishment cell does not satisfy the preset cell selection criterion, or that the UE fails to receive an RRC connection reestablishment command sent by the network-side device controlling the reestablishment cell.

In this method, if the UE is subsequently connected with the network side in an RRC connection establishment procedure, then the UE will not report any information related to the connection failure to the network side.

If the UE stores the information related to the connection failure which carries no ID of the reestablishment cell, then if the UE is subsequently connected with the network side in an RRC connection establishment procedure, and reports the information related to the connection failure stored by the UE to the network side, then the network side performs the following steps:

The network side receives the information related to the connection failure reported by the UE; and The network will not perform mobility robustness optimization upon determining to carry, in information related to the connection failure stored by the UE, no ID of the selected reestablishment cell.

Particularly upon reception of the information related to the connection failure sent by the UE, the network side firstly determines, from measurement information (i.e., RSRP/RSRQs) in the information related to the connection failure, whether the connection failure of the UE arises from a coverage hole; if the network side determines that the connection failure of the UE does not arise from a coverage hole and the network side determines that the ID of the reestablishment cell does not exist in the information related to the connection failure, then ignores the current report and will not optimize any mobility robustness parameter using the information of the current report.

It shall be noted that reference can be made to the 3GPP 36.331 protocol for the obtainment by the network side of the information related to the connection failure stored by the UE; and Reference can be made to the 3GPP 36.331 protocol for the determination by the network side, from the measurement information (i.e., RSRP/RSRQs) in the information related to the connection failure, whether the connection failure of the UE arises from a coverage hole.

By way of an example, it is assumed that a cell A serves a connected UE, and there are three adjacent cells to the cell A, including a cell B, a cell C, and a cell D; and If the UE is subjected to an RLF, then the UE measures RSRQ values of the serving cell (i.e., the cell A) and the adjacent cells (i.e., the cell B, the cell C, and the cell D) upon the connection failure respectively, where the measured RSRQ values of the cell A, the cell B, the cell C, and the cell D are $RSRQ_A$, $RSRQ_B$, $RSRQ_C$ and $RSRQ_D$, where $RSRQ_C > RSRQ_B > RSRQ_D > RSRQ_A$; and if the UE selects the cell B to initiate an RRC connection reestablishment request, but in the RRC connection reestablishment procedure, the UE detects that a signal of the cell B does not satisfy a cell selection criterion, or that the UE fails to receive an RRC connection reestablishment command sent by a network-side device controlling the cell B after the RRC connection reestablishment request is initiated, and at this time the UE will not continue with the RRC connection reestablishment procedure but will return to the idle state; and thereafter the UE initiates an RRC connection establishment procedure to the cell C, and carries information related to the RLF stored by the UE (i.e., an RLF report), in an RRC Connection Establish Complete message sent to a network-side device controlling the cell C, so that the network-side device controlling the cell C obtains the RLF report of the UE; and In an implementation, if the UE carries in the RLF report the ID of the cell B as the ID of the reestablishment cell, then correspondingly the network side analyzes RLF report data currently recorded by the UE, where since there is such a typical handover too late scenario that the UE is subjected to the connection failure in the cell A and reestablishes an RRC connection in the cell B, the network side will determines that the connection failure arises from the handover too late from the cell A to the cell B, and if a statistic reaches a preset threshold, then the network side will adjust a handover parameter from the cell A to the cell B, so that the UE can be handed over earlier from the cell A to the cell B. However the cell B actually is not the most appropriate cell;

In another implementation, if the UE carries no ID of the reestablishment cell into the RLF report, then correspondingly the network side determines from the RSRP/RSRQs of the current cell and the adjacent cells reported by the UE that the current connection failure does not arise from a network hole, so the network side will not count the statistic of the current report as a coverage hole; and also since the RLF report carries no ID of the reestablishment cell, the network side will not perform mobility robustness optimization referring to the current report either, so the network side will not adjust the handover parameter from the cell A to the cell B either; and In still another implementation, if the UE will not make any RLF report to the network side after being connected with the network side from the idle state, then correspondingly the network side will not take the current failure as a coverage hole, or an input to mobility robustness optimization because no report of the UE is received.

The method for reestablishing an RRC connection according to the embodiments of the invention will be described below by way of an example in which a connection failure of a UE is an RLF, and the same will apply to other connection failures, although a repeated description thereof will be omitted here.

Figure 2:
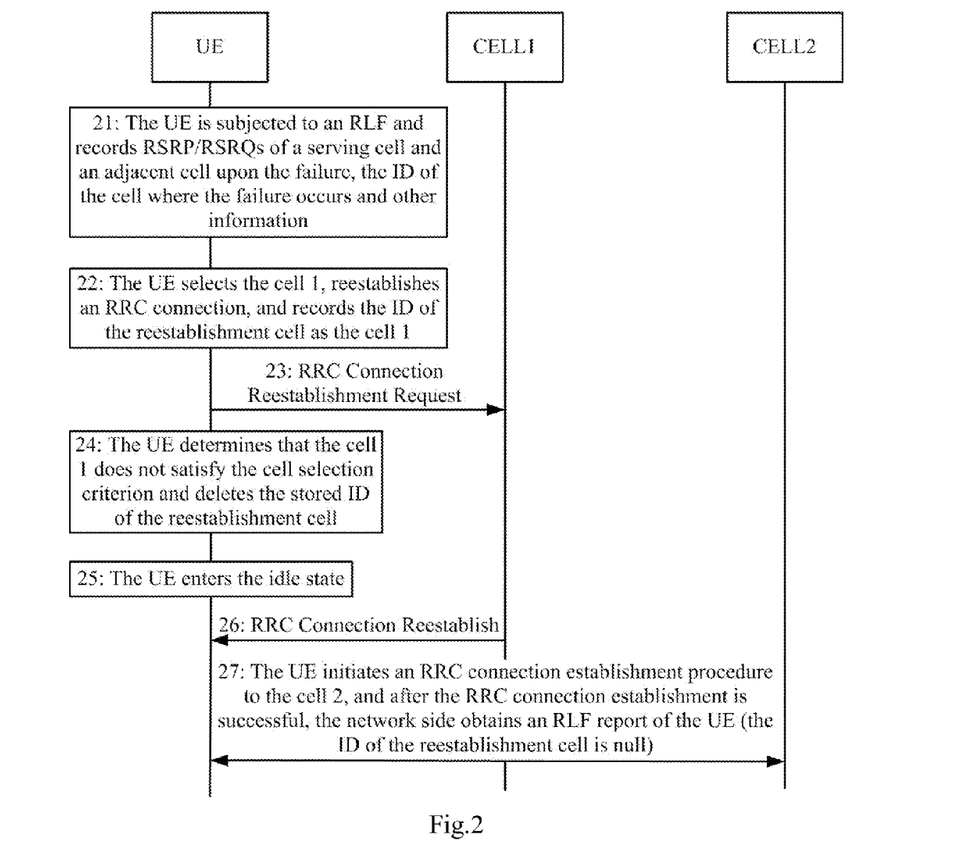
FIG. 2 illustrates a schematic flow chart of a first embodiment according to the invention.

In a first embodiment, referring to FIG. 2, a method for reestablishing an RRC connection according to this embodiment includes the following steps:

In the step 21, a UE determines that the UE is subjected to an RLF, and records RSRP/RSRQs of a serving cell of the UE, and an adjacent cell to the serving cell when the RLF occurs, the ID of the cell where the failure occurs (i.e., the ID of the last serving cell of the UE), and other information;

In the step 22, the UE selects a cell as per a preset cell selection criterion, and selects the cell 1, reestablishes an RRC connection, and records the ID of the reestablishment cell as the cell 1;

In the step 23, the UE sends an RRC connection reestablishment request to a network-side device controlling the cell 1;

In the step 24, if the UE determines that the cell 1 does not satisfy the cell selection criterion in the RRC connection reestablishment procedure, then the UE deletes the ID of the reestablishment cell stored by the UE;

In the step, the UE enters the idle state;

In the step 26, the UE receives an RRC connection reestablishment command sent by the network-side device controlling the cell; and In the step 27, the UE initiates an RRC connection establishment procedure to the cell 2, and after the RRC connection establishment is successful, a network-side device controlling the cell 2 obtains an RLF report stored by the UE carrying the ID of the reestablishment cell which is null;

Here the RLF report includes the RSRP/RSRQs of the serving cell of the UE, and the adjacent cell to the serving cell when the RLF occurs, the ID of the cell where the failure occurs, and the other information;

In this embodiment, the network-side device firstly determines from the RSRP/RSRQs in the RLF report whether there is a coverage hole upon reception of the RLF report; and if there is no coverage hole, and the ID of the reestablishment cell is absent, then the network-side device will not optimize any mobility robustness parameter according to the RLF report.

Figure 3:
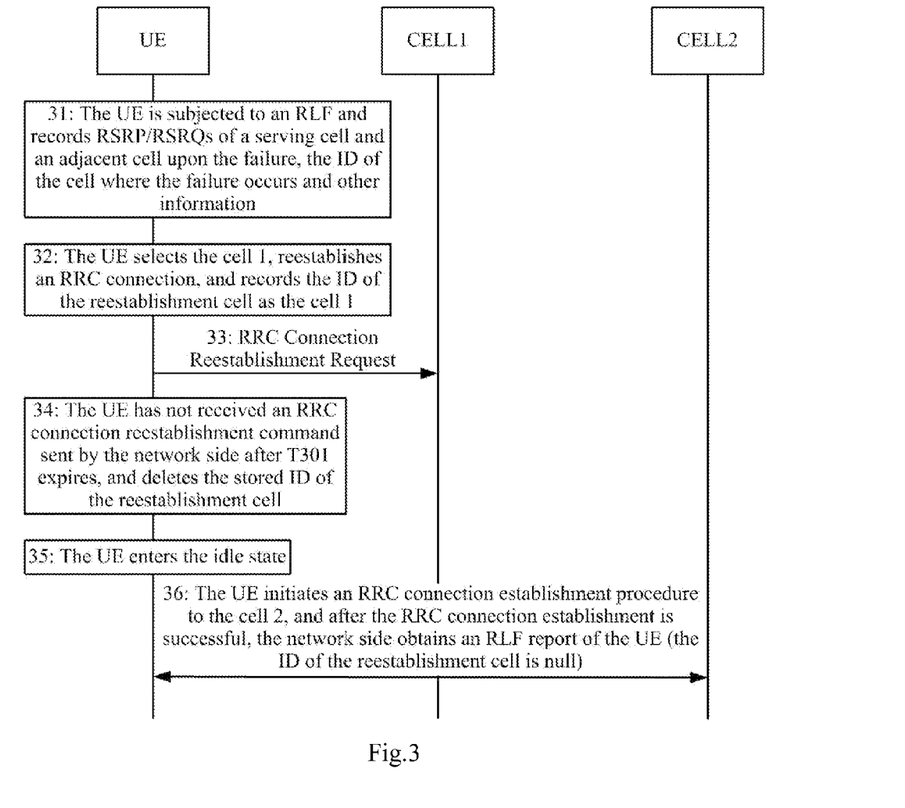
FIG. 3 illustrates a schematic flow chart of a second embodiment according to the invention.

In a second embodiment, referring to FIG. 3, a method for reestablishing an RRC connection according to this embodiment includes the following steps:

In the step 31, a UE determines that the UE is subjected to an RLF, and records RSRP/RSRQs of a serving cell of the UE, and an adjacent cell to the serving cell when the RLF occurs, the ID of the cell where the failure occurs, and other information;

In the step 32, the UE selects a cell as per a preset cell selection criterion, and selects the cell 1, reestablishes an RRC connection, and records the ID of the reestablishment cell as the cell 1;

In the step 33, the UE sends an RRC connection reestablishment request to a network-side device controlling the cell 1;

In the step 34, the UE has not received an RRC connection reestablishment command sent by the network-side device controlling the cell 1 after a timer T301 expires;

In the step 35, the UE enters the idle state; and

In the step 36, the UE initiates an RRC connection establishment procedure to the cell 2, and after the RRC connection establishment is successful, a network-side device controlling the cell 2 obtains an RLF report stored by the UE carrying the ID of the reestablishment cell which is null;

Here the RLF report includes the RSRP/RSRQs of the serving cell of the UE, and the adjacent cell to the serving cell when the RLF occurs, the ID of the cell where the failure occurs, and the other information;

In this embodiment, the network-side device firstly determines from the RSRP/RSRQs in the RLF report whether there is a coverage hole upon reception of the RLF report; and if there is no coverage hole, and the ID of the reestablishment cell is absent, then the network-side device will not optimize any mobility robustness parameter according to the RLF report.

Figure 4:
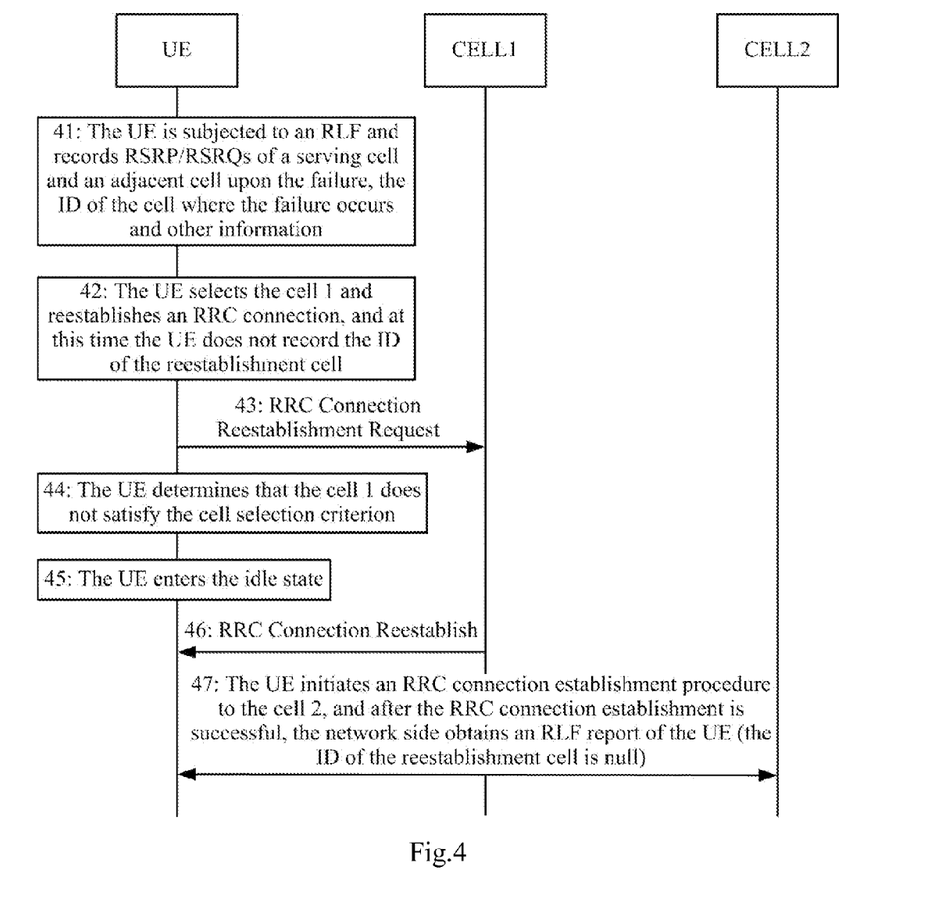
FIG. 4 illustrates a schematic flow chart of a third embodiment according to the invention.

In a third embodiment, referring to FIG. 4, a method for reestablishing an RRC connection according to this embodiment includes the following steps:

In the step 41, a UE determines that the UE is subjected to an RLF, and records RSRP/RSRQs of a serving cell of the UE, and an adjacent cell to the serving cell when the RLF occurs, the ID of the cell where the failure occurs, and other information;

In the step 42, the UE selects a cell as per a preset cell selection criterion, and selects the cell 1, and reestablishes an RRC connection, and at this time the UE does not record the ID of the reestablishment cell;

In the step 43, the UE sends an RRC connection reestablishment request to a network-side device controlling the cell 1;

In the step 44, the UE determines that the cell 1 does not satisfy the cell selection criterion in the RRC connection reestablishment procedure;

In the step 45, the UE enters the idle state;

In the step 46, the UE receives an RRC connection reestablishment command sent by the network-side device controlling the cell 1; and In the step 47, the UE initiates an RRC connection establishment procedure to the cell 2, and after the RRC connection establishment is successful, a network-side device controlling the cell 2 obtains an RLF report stored by the UE carrying the ID of the reestablishment cell which is null;

Here the RLF report includes the RSRP/RSRQs of the serving cell of the UE, and the adjacent cell to the serving cell when the RLF occurs, the ID of the cell where the failure occurs, and the other information;

In this embodiment, the network-side device firstly determines from the RSRP/RSRQs in the RLF report whether there is a coverage hole upon reception of the RLF report; and if there is no coverage hole, and the ID of the reestablishment cell is absent, then the network-side device will not optimize any mobility robustness parameter according to the RLF report.

Figure 5:
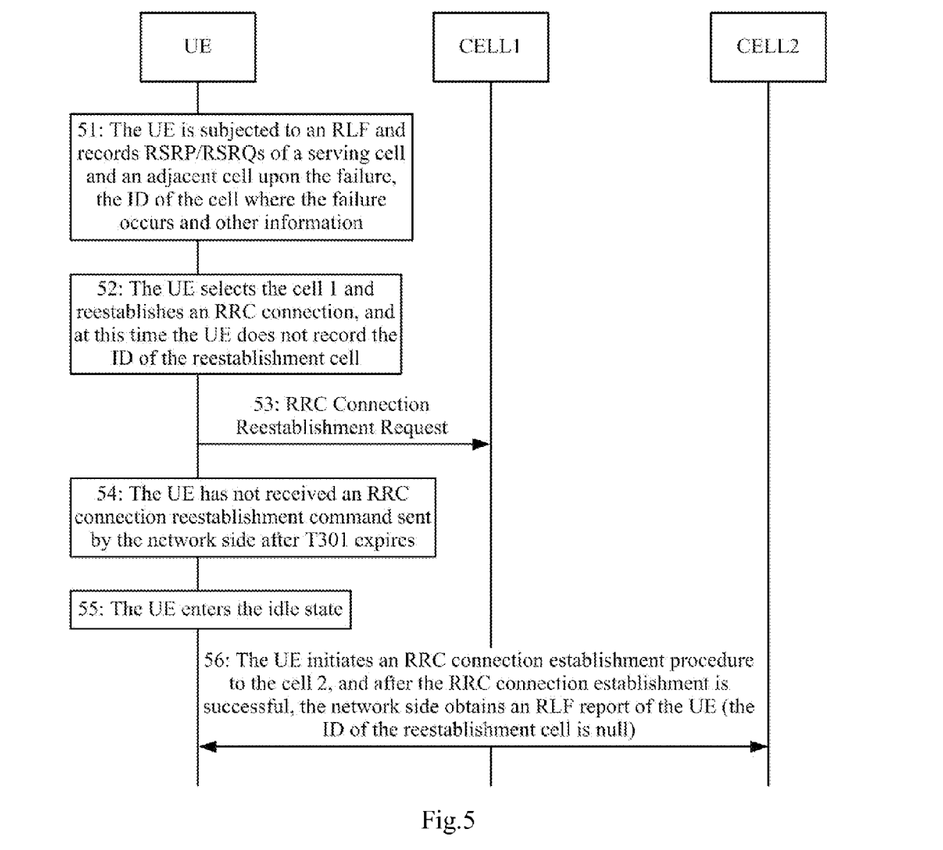
FIG. 5 illustrates a schematic flow chart of a fourth embodiment according to the invention.

In a fourth embodiment, referring to FIG. 5, a method for reestablishing an RRC connection according to this embodiment includes the following steps:

In the step 51, a UE determines that the UE is subjected to an RLF, and records RSRP/RSRQs of a serving cell of the UE, and an adjacent cell to the serving cell when the RLF occurs, the ID of the cell where the failure occurs, and other information;

In the step 52, the UE selects a cell as per a preset cell selection criterion, and selects the cell 1, and reestablishes an RRC connection, and at this time the UE does not record the ID of the reestablishment cell;

In the step 53, the UE sends an RRC connection reestablishment request to a network-side device controlling the cell 1;

In the step 54, the UE has not received an RRC connection reestablishment command sent by the network-side device controlling the cell 1 after a timer T301 expires;

In the step 55, the UE enters the idle state; and

In the step 56, the UE initiates an RRC connection establishment procedure to the cell 2, and after the RRC connection establishment is successful, a network-side device controlling the cell 2 can obtain an RLF report stored by the UE carrying the ID of the reestablishment cell which is null;

Here the RLF report includes the RSRP/RSRQs of the serving cell of the UE, and the adjacent cell to the serving cell when the RLF occurs, the ID of the cell where the failure occurs, and the other information;

In this embodiment, the network-side device firstly determines from the RSRP/RSRQs in the RLF report whether there is a coverage hole upon reception of the RLF report; and if there is no coverage hole, and the ID of the reestablishment cell is absent, then the network-side device will not optimize any mobility robustness parameter according to the RLF report.

Figure 6:
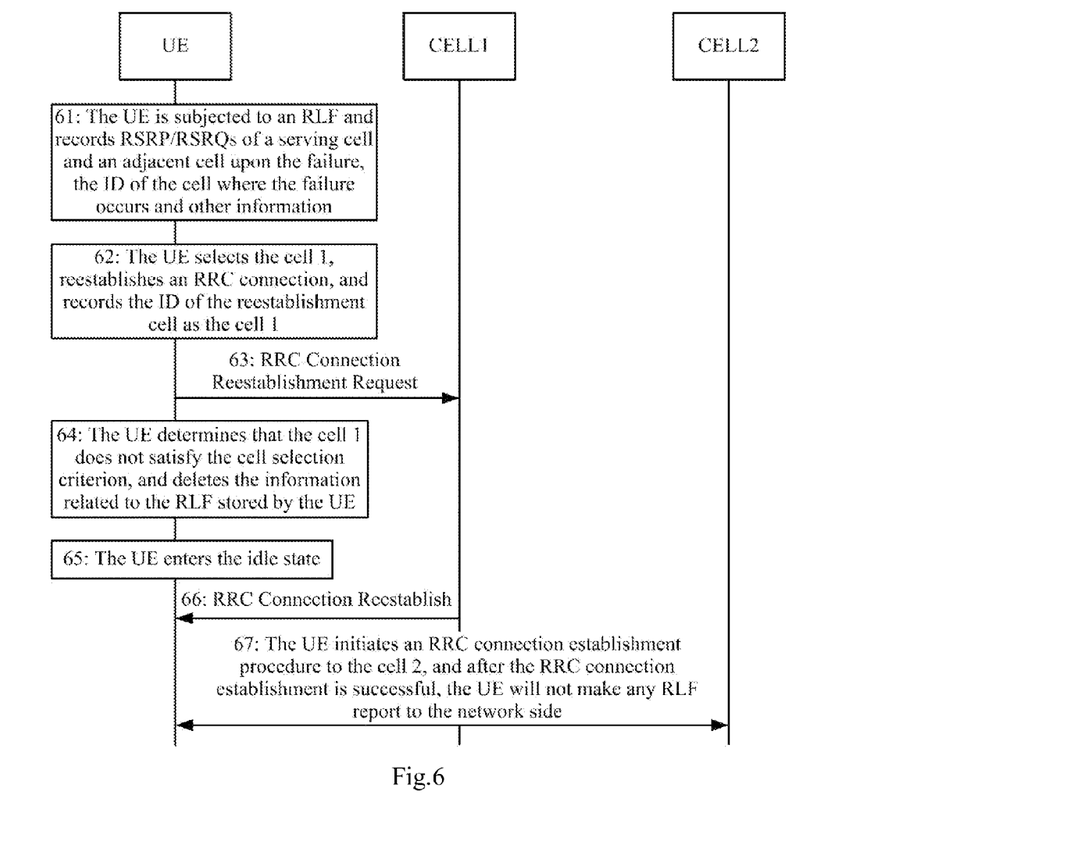
FIG. 6 illustrates a schematic flow chart of a fifth embodiment according to the invention.

In a fifth embodiment, referring to FIG. 6, a method for reestablishing an RRC connection according to this embodiment includes the following steps:

In the step 61, a UE determines that the UE is subjected to an RLF, and records RSRP/RSRQs of a serving cell of the UE, and an adjacent cell to the serving cell when the RLF occurs, the ID of the cell where the failure occurs, and other information;

In the step 62, the UE selects a cell as per a preset cell selection criterion, and selects the cell 1, reestablishes an RRC connection, and records the ID of the reestablishment cell as the cell 1;

In the step 63, the UE sends an RRC connection reestablishment request to a network-side device controlling the cell 1;

In the step 64, if the UE determines that the cell 1 does not satisfy the cell selection criterion in the RRC connection reestablishment procedure, then the UE deletes recorded information related to the RLF;

In the step 65, the UE enters the idle state;

In the step 66, the UE receives an RRC connection reestablishment command sent by the network-side device controlling the cell 1; and In the step 67, the UE initiates an RRC connection establishment procedure to the cell 2, and after the RRC connection establishment is successful, the UE will not make any RLF report to a network-side device controlling the cell 2.

Figure 7:
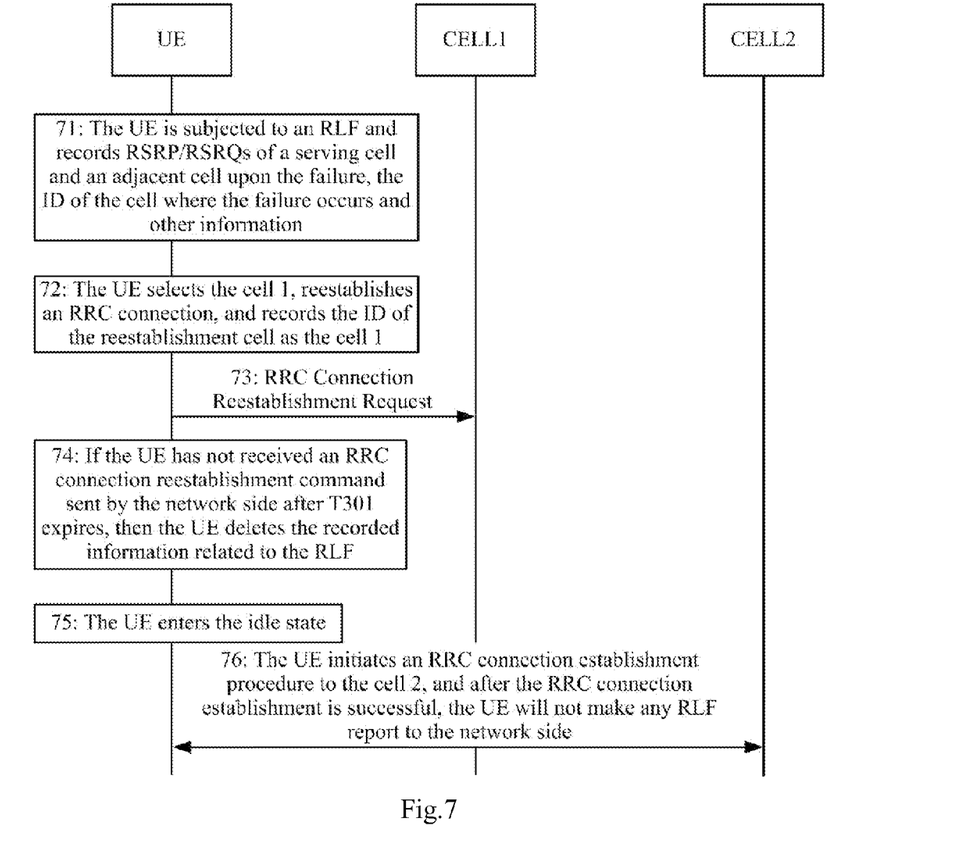
FIG. 7 illustrates a schematic flow chart of a sixth embodiment according to the invention.

In a sixth embodiment, referring to FIG. 7, a method for reestablishing an RRC connection according to this embodiment includes the following steps:

In the step 71, a UE determines that the UE is subjected to an RLF, and records RSRP/RSRQs of a serving cell of the UE, and an adjacent cell to the serving cell when the RLF occurs, the ID of the cell where the failure occurs, and other information;

In the step 72, the UE selects a cell as per a preset cell selection criterion, and selects the cell 1, reestablishes an RRC connection, and records the ID of the reestablishment cell as the cell 1;

In the step 73, the UE sends an RRC connection reestablishment request to a network-side device controlling the cell 1;

In the step 74, if the UE has not received an RRC connection reestablishment command sent by the network-side device controlling the cell 1 after a timer T301 expires, then the UE deletes recorded information related to the RLF;

In the step 75, the UE enters the idle state; and

In the step 76, the UE initiates an RRC connection establishment procedure to the cell 2, and after the RRC connection establishment is successful, the UE will not make any RLF report to a network-side device controlling the cell 2.

The process flows of the method can be performed in software program which can be stored in a storage medium, and the stored software program can perform the steps of the method upon being executed.

Based upon the same inventive idea, an embodiment of the invention further provides a user equipment, and since the user equipment addresses the problem under a similar principle to the method above for reestablishing an RRC connection, reference can be made to the implementation of the method for an implementation of the user equipment, so a repeated description thereof will be omitted here.

Figure 8:
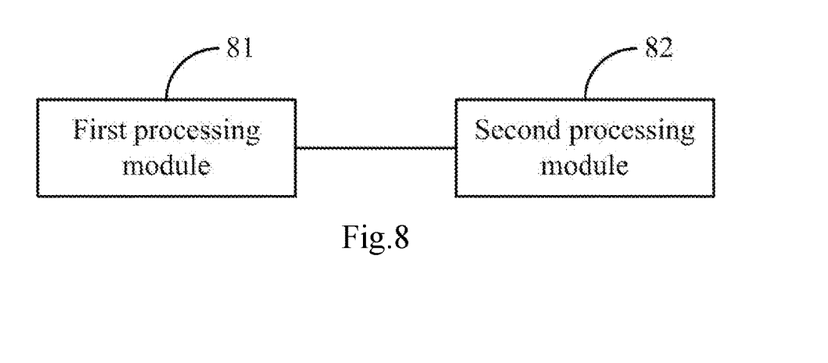
FIG. 8 illustrates a schematic diagram of a user equipment according to an embodiment of the invention.

Referring to FIG. 8, there is a user equipment according to an embodiment of the invention, applicable to a scenario where a connection failure occurs, where the user equipment includes:

A first processing module 81 is configured to initiate an RRC connection reestablishment request on a selected reestablishment cell; and A second processing module 82 is configured to determine to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

In an implementation,

The first processing module 81 is configured to store the ID of the reestablishment cell into the information related to the connection failure when the RRC connection reestablishment request is initiated on the reestablishment cell; and The second processing module 82 is configured to delete the ID of the reestablishment cell stored in the information related to the connection failure upon determining that the reestablishment cell does not satisfy the preset cell selection criterion, or that the UE fails to receive a RRC connection reestablishment command sent by the network-side device controlling the reestablishment cell.

In another implementation,

The first processing module 81 is configured to store no ID of the reestablishment cell into the information related to the connection failure when the RRC connection reestablishment request is initiated on the reestablishment cell.

In still another implementation,

The first processing module 81 is configured to store an ID of the reestablishment cell into the information related to the connection failure when the RRC connection reestablishment request is initiated on the reestablishment cell; and The second processing module 82 is configured to delete all the information related to the connection failure stored by the UE upon determining that the reestablishment cell does not satisfy the preset cell selection criterion, or that the UE fails to receive a RRC connection reestablishment command sent by the network-side device controlling the reestablishment cell.

In an implementation, the second processing module 82 configured to determine that the UE fails to receive a RRC connection reestablishment command sent by the network-side device controlling the reestablishment cell is configured:

To start a configured timer when the RRC connection reestablishment request is sent to the network-side device controlling the reestablishment cell; and to determine that the UE fails to receive an RRC connection reestablishment command sent by the network-side device controlling the reestablishment cell, when the configured timer expires.

Figure 9:
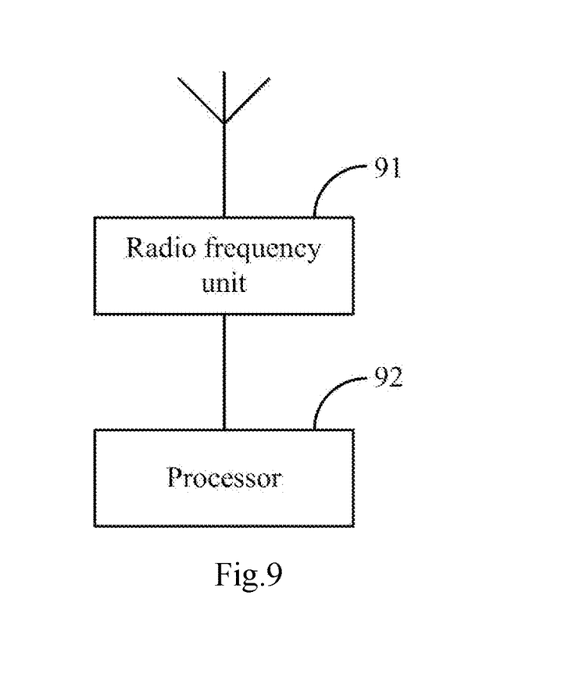
FIG. 9 illustrates a schematic diagram of another user equipment according to an embodiment of the invention.

Based upon the same inventive idea as the method, an embodiment of the invention provides another user equipment as illustrated in FIG. 9 including a processor 91 and a radio frequency unit 92, where:

The processor 91 is configured to initiate an RRC connection reestablishment request on a selected reestablishment cell through the radio frequency unit 92 upon determining that the UE is subjected to a connection failure; and to determine to carry, in information related to the connection failure stored by the UE, no ID of the selected reestablishment cell or to store no information related to the connection failure, upon determining that the reestablishment cell does not satisfy a preset cell selection criterion, or that the UE fails to receive a RRC connection reestablishment command sent by a network-side device controlling the reestablishment cell.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reestablishing a Radio Resource Control (RRC) connection, the method comprising:
  initiating, by a User Equipment (UE) subjected to a connection failure, an RRC connection reestablishment request on a selected reestablishment cell and
    recording an Identity (ID) of the selected reestablishment cell into information related to the connection failure upon determining that the RRC connection reestablishment request is initiated on the selected reestablishment cell,
  wherein the connection failure comprises a Radio Link Failure (RLF) or a Handover Failure (HOF), and
  the information related to the connection failure is stored by the UE upon determining that the UE is subjected to the connection failure;
  determining, by the UE, that the UE fails to receive an RRC connection reestablishment command sent by a network-side device controlling the selected reestablishment cell; and
  in response to the determining that the UE fails to receive the RRC connection reestablishment command sent by the network-side device controlling the selected reestablishment cell,
    deleting, by the UE, the ID of the selected reestablishment cell from the information related to the connection failure such that no ID of the selected reestablishment cell is included in the information related to the connection failure.

2. The method according to claim 1,
  wherein determining, by the UE, that the UE fails to receive the RRC connection reestablishment command sent by the network-side device controlling the selected reestablishment cell comprises:
  starting, by the UE, a configured timer upon determining that the RRC connection reestablishment request is sent to the network-side device controlling the selected reestablishment cell; and
  determining, by the UE, that the UE fails to receive the RRC connection reestablishment command sent by the network-side device controlling the selected reestablishment cell, upon determining that the configured timer expires.

3. A User Equipment (UE),
  wherein the UE is subjected to a connection failure, the connection failure comprises a Radio Link Failure (RLF) or a Handover Failure (HOF), and the UE comprises:
  at least one processor; and a memory communicably connected with the at least one processor for storing instructions executable by the at least one processor, wherein execution of the instructions by the at least one processor causes the at least one processor to perform:
  initiating a Radio Resource Control (RRC) connection reestablishment request on a selected reestablishment cell and
  recording an Identity (ID) of the selected reestablishment cell into information related to the connection failure upon determining that the RRC connection reestablishment request is initiated on the selected reestablishment cell,
  wherein the information related to the connection failure is stored by the UE upon determining that the UE is subjected to the connection failure;
  determining that the UE fails to receive an RRC connection reestablishment command sent by a network-side device controlling the selected reestablishment cell; and
  in response to the determining that the UE fails to receive the RRC connection reestablishment command sent by the network-side device controlling the selected reestablishment cell,
    deleting, by the UE, the ID of the selected reestablishment cell from the information related to the connection failure such that no ID of the selected reestablishment cell is included in the information related to the connection failure.

4. The UE according to claim 3,
  wherein determining that the UE fails to receive the RRC connection reestablishment command sent by the network-side device controlling the selected reestablishment cell comprises:
  starting a configured timer upon determining that the RRC connection reestablishment request is sent to the network-side device controlling the selected reestablishment cell; and
  determining that the UE fails to receive the RRC connection reestablishment command sent by the network-side device controlling the selected reestablishment cell, upon determining that the configured timer expires.

* * * * *

UNITED STATES PATENT AND TRADEMARK OFFICE
CERTIFICATE OF CORRECTION

PATENT NO. : 10,356,834 B2  
APPLICATION NO. : 14/772075  
DATED : July 16, 2019  
INVENTOR(S) : Aijuan Liu and Yumin Wu Page 1 of 1

It is certified that error appears in the above-identified patent and that said Letters Patent is hereby corrected as shown below:

On the Title Page

Item (73)
Please correct Assignee's name from CHINA ACADEMY OF TECHNOLOMMUNICATIONS TECHNOLOGY to CHINA ACADEMY OF TELECOMMUNICATIONS TECHNOLOGY.

Signed and Sealed this  
Seventh Day of April, 2020

Andrei Iancu  
*Director of the United States Patent and Trademark Office*